Feb. 14, 1950
E. L. SEGUIN ET AL
2,497,375
MEANS TO CHECK OPERATIONS OF STEAM TRAPS
Filed June 11, 1946
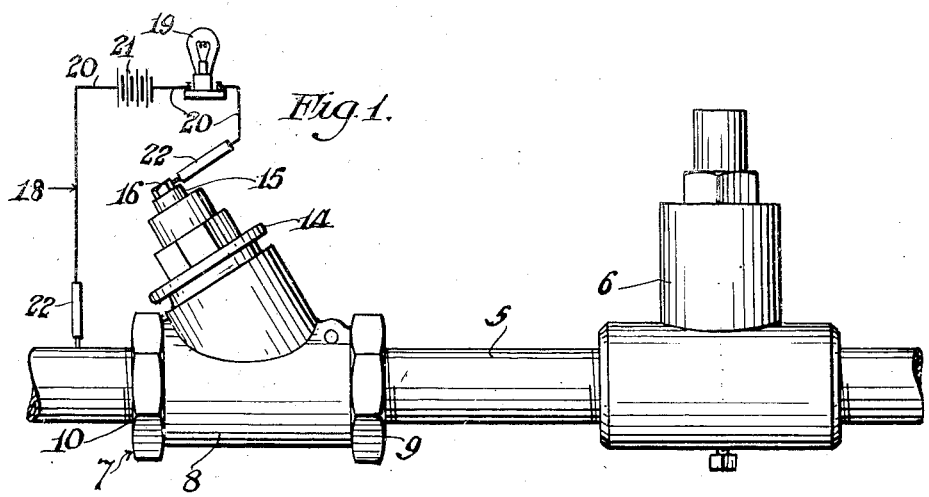
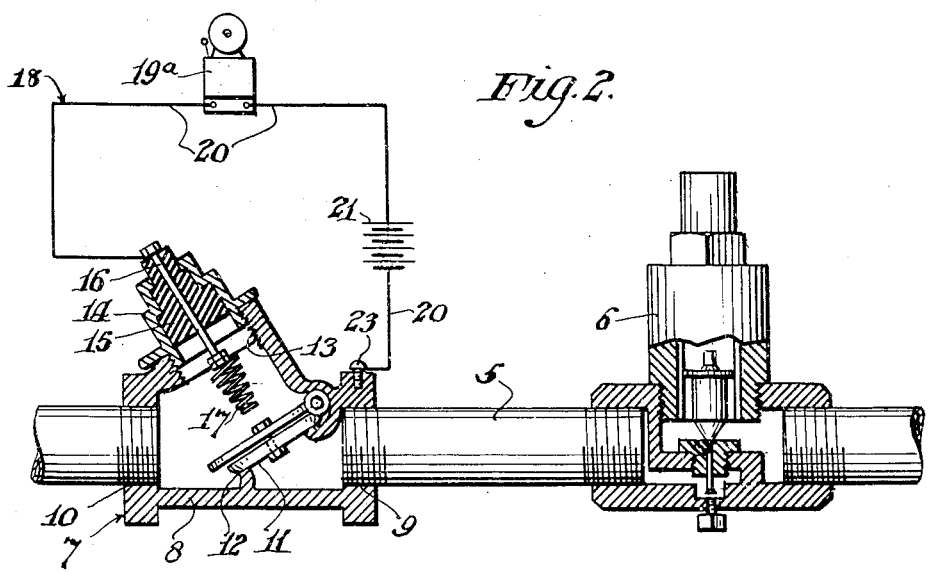
Inventors:
Edmund L. Seguin
and Mary Klein,
By W. W. Williamson
Attorney.

Patented Feb. 14, 1950

2,497,375

UNITED STATES PATENT OFFICE 2,497,375

MEANS TO CHECK OPERATIONS OF STEAM TRAPS

Edmund L. Seguin and Mary Klein, Philadelphia, Pa.

Application June 11, 1946, Serial No. 675,882

1 Claim. (Cl. 177—311)

Our invention relates to new and useful means to check operations of steam traps, and has for one of its objects to provide in combination with a steam trap, a combination of elements which cooperate with one another to indicate whether or not the steam trap is functioning properly.

Another object of the invention is to provide a check valve in the steam line with a trap, in back of the trap or in succession relative to the trap, when considered in connection with the direction of travel of the steam, and associate an electrical signal circuit with said check valve to indicate the working or non-working conditions of said trap.

Another object of this invention is to provide the combination of a steam line, a trap therein, a check valve also in said steam line adjacent the trap in back of the latter, and an electrical signal in circuit with portions of said check valve.

Another object of the present invention is to provide a check valve of unique construction whereby an electrically operated signal system, including a signal device, source of current and conductors, may be connected thereto.

A further object of the invention is to provide a compressible electrical contact in the check valve whereby an electrical circuit may be closed without effecting the operations of said check valve.

With the above and other objects in view this invention consists of the details of construction and combination of elements hereinafter set forth and then designated by the claim.

In order that those skilled in the art to which this invention appertains may understand how to make and use the same we will describe its construction in detail, referring by numerals to the accompanying drawing forming a part hereof, in which:

Fig. 1 is a view of a part of a steam line with our invention connected therewith and illustrating one form of signal system.

Fig. 2 is a similar view with the check valve in section and a conventional trap partly in section and showing another type of signal system and a different mode of connection.

In carrying out our invention as herein embodied, 5 represents a steam line or a line of pipe carrying steam, condensate and the like. Interposed in this line is a trap 6 of any desirable or well known construction for trapping the steam and permitting the condensate to flow past at intervals.

Often a trap sticks in the open position and allows steam to continuously flow through the line, which is wasteful, or a trap may stick in the closed position and thereby stop the flow of steam or condensate so that the work is arrested or delayed. Either condition makes it imperative that the non-working trap be repaired or reconditioned and where there are a number of traps on a return pipe it is a rather difficult task because all or nearly all of the traps may have to be opened to locate the inoperative one.

These disadvantages are overcome by the present invention which includes a check valve 7 of special construction interposed in the steam line 5 back of the trap 6 or in succession relative to the trap according to the direction of flow through the line 5. The check valve 7 includes a body 8 having an inlet end 9 and an outlet end 10 with a pivoted flapper valve member 11 between said inlet and outlet ends and cooperating with a seat 12. The body also has a cap receiving or access opening 13 in which is mounted the cap or closure 14 provided with a block of insulating material 15 in which is mounted the post 16 of electrical conducting material. This post is permanently fixed in the insulating material with the outer end protruding from the insulating material to the exterior of the check valve. The inner end of the post 16 projects from the inner portion of the insulating material and said inner end of post or a component part thereof, such as a spring 17, is in the path of travel of the valve member 11. The spring 17 makes a compressible contact so that a very slight movement of the valve member 11 will complete a portion of an electrical circuit and will permit said valve member to make a complete unrestricted movement.

An electrical signal system 18 is provided between the outer end of the post 16 and a portion of the check valve body or the steam line. An electrical signal system may comprise a visible signal device 19 or an audible signal device 19a connected by conductors 20 with a source of current 21, such as a battery, and the contacts 22, Fig. 1, or fixed directly to the post 16 and a terminal 23, as in Fig. 2.

In operation, the trap 6 intermittently opens and closes and when closed it holds back the steam but when it opens the accumulated condensate will flow out of the line. In order to ascertain whether any certain trap is working properly with a signal system similar to that depicted in Fig. 1, the contacts 22 are engaged with the outer end of the post 16 and some part of the check valve body or steam line which will complete the electrical circuit through the signal device. If the trap is not working and remains closed the signal device will not operate or if said trap remains open the signal device will be in constant operation whereas if the trap is properly functioning the signal device will operate intermittently.

With the form of signal system illustrated in Fig. 2, it will always be in condition for operation and will respond to the actions of the trap as translated through the movements of the check valve. Of course, a well known form of switch might be included in the circuit of said Fig. 2 so that the signal might be turned on and off as desired.

Since the signal devices of Figs. 1 and 2 are readily interchangeable either may be substituted for the other to provide either a visible or audible signal as desired or preferred.

Of course we do not wish to be limited to the exact details of construction as herein shown and described as these may be varied within the scope of the appended claim without departing from the spirit of our invention.

Having described our invention what we claim as new and useful is:

In combination, a steam line, a steam trap interposed in said line and ordinarily closed to hinder the passage of steam through the line and being opened by the accumulation of condensation to intermittently cause a flow of condensate past said steam trap, and means also interposed in said line behind the steam trap relative to the direction of steam travel, said means translating the mechanical functions of the steam trap and comprising a check valve, including a body and pivoted flapper, positioned to prevent return flow of the condensate passing through said check valve from said steam trap, and electrically operated signal means connected to the check valve to be actuated by the movements of the flapper.

EDMUND L. SEGUIN.
MARY KLEIN.

REFERENCES CITED

The following references are of record in the file of this patent:

UNITED STATES PATENTS

| Number | Name | Date |
|---|---|---|
| 490,684 | Schilling et al. | Jan. 31, 1893 |
| 941,053 | Young | Nov. 23, 1909 |
| 1,090,669 | Woodington et al. | Mar. 17, 1914 |
| 1,169,692 | Surren | Jan. 25, 1916 |
| 1,351,779 | Mather | Sept. 7, 1920 |
| 1,376,166 | Rosenberg | Apr. 26, 1921 |
| 1,411,787 | Kaufman | Apr. 4, 1922 |
| 1,490,901 | Hendricks, Jr. | Apr. 15, 1924 |
| 1,968,648 | Kendall | July 31, 1934 |

FOREIGN PATENTS

| Number | Country | Date |
|---|---|---|
| 338,602 | Great Britain | Nov. 24, 1930 |